No. 865,696. PATENTED SEPT. 10, 1907.
R. C. & H. R. HARRIS.
H. B. McCOY, ADMINISTRATOR OF R. C. HARRIS, DEC'D.
FOUR HORSE EVENER.
APPLICATION FILED OCT. 9, 1905.
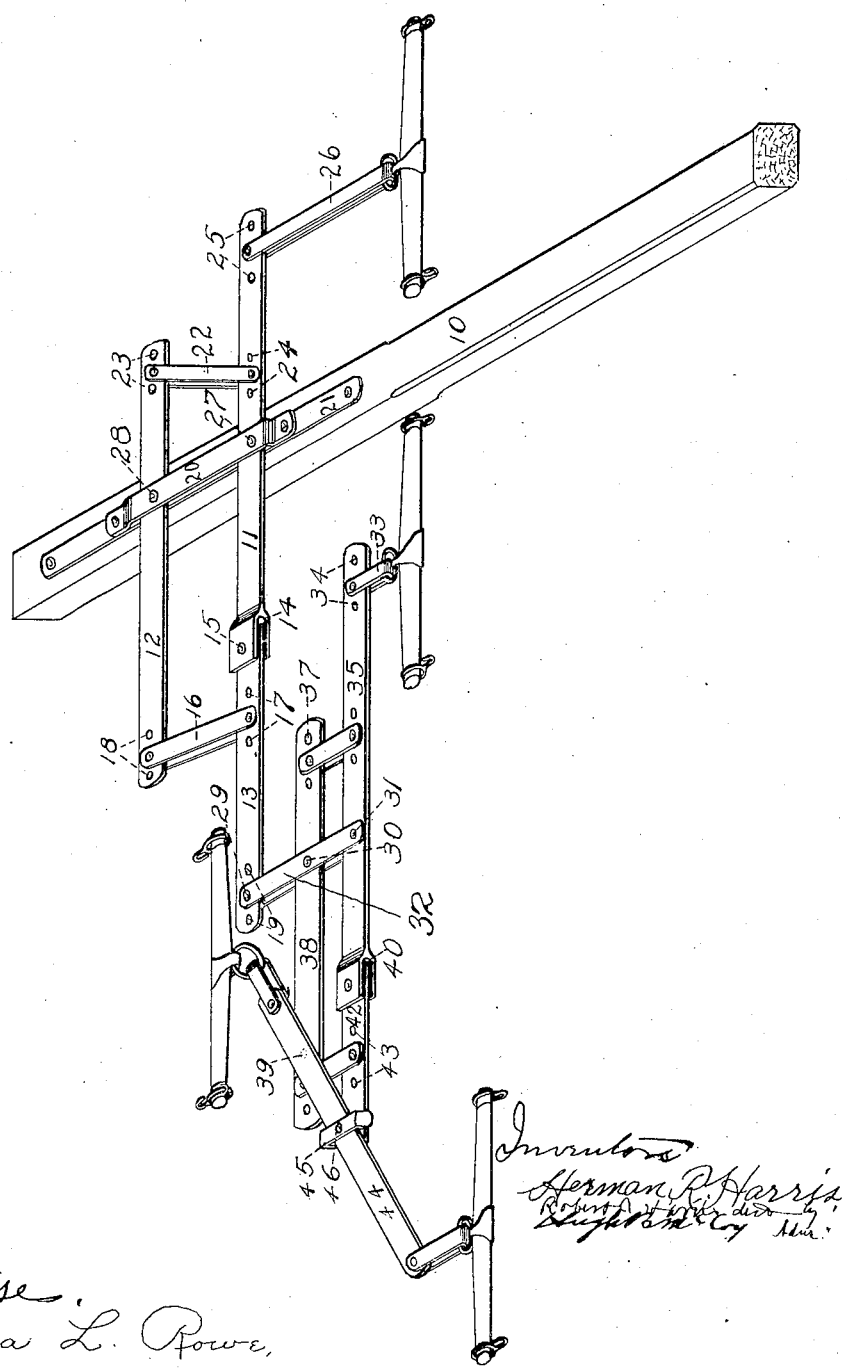

UNITED STATES PATENT OFFICE.

HUGH B. McCOY, ADMINISTRATOR OF ROBERT C. HARRIS, DECEASED, AND HERMAN R. HARRIS, OF OSKALOOSA, IOWA.

FOUR-HORSE EVENER.

No. 865,696.   Specification of Letters Patent.   Patented Sept. 10, 1907.

Application filed October 9, 1905. Serial No. 282,022.

*To all whom it may concern:*

Be it known that HERMAN R. HARRIS and ROBERT C. HARRIS, deceased, both citizens of the United States, and formerly residing at Oskaloosa, in the county of Mahaska and State of Iowa, where the first-named petitioner now resides, have invented new and useful Improvements in Four-Horse Eveners, of which the following is a specification.

This invention contemplates certain improvements on the device for equalizing draft which is described and claimed in the patent issued to Robert C. Harris, now deceased, September 12, 1899, No. 632,869, and the object of the invention is to secure the same advantages and useful results that are described in the specification forming part of said Letters Patent, the present invention being adaptable for four horses instead of the arrangement for three horses described in the said patent.

The invention consists in certain details of construction, arrangements and combinations of the draft equalizing levers and accompanying parts, which will be hereinafter fully set forth and particularly pointed out in the appended claims.

For a full description of the invention and the merits thereof and also to acquire a knowledge of the details of construction of the means for effecting the result, reference is to be had to the following description and accompanying drawing, in which the figure is a perspective view of the invention.

Corresponding and like parts are referred to in the following description and indicated in the drawing by the same reference characters.

Referring to the drawing, the numeral 10 designates the tongue, which, it is to be understood, is connected with the hounds of the front truck in the usual manner. On the top of the tongue a plate 21 is fixed and secured to said plate and above the same is in turn secured a shorter plate 20, bolts or the like 27 and 28 being employed for this purpose. Interposed between the front end of the plate 20 and along the plate 21 is a transversely extending lever 11 which is pivotally mounted between its ends on the bolt 27 and which carries at one extreme end a swingle tree secured thereto by means of a clevis 26 which may be secured as shown in any one of a plurality of apertures in the said end of the lever. Intermediate of this end of the lever 11 and the pivot point 27, the said lever is formed with another plurality of apertures 24 in any one of which the front ends of a pair of links 22 may be pivotally secured, said links preferably embracing the lever as shown. The normal position of the links 22 is at an oblique angle with the tongue 10. The rear end of said links 22 are pivotally connected by any one of a plurality of apertures 23 to the shorter end of another lever 12. The lever 12 is at the rear of the lever 11 and is interposed between the rear end of the plate 20 and the plate 21 and is pivotally connected intermediate of its ends between said plates on the bolt 28. The longer arm of the lever 12 extends beyond the longer arm of the lever 11 and is provided at its extremity with a plurality of apertures 18. A pair of links 16, corresponding to the links 22, is secured by the rear ends of the links 16 to the longer arm of the lever 12 by a bolt passed through any one of the apertures 18, and said links 16 extend obliquely in opposite direction to the links 22. The extension bar 13 is pivotally connected at its innermost end to the longer arm of the lever 11 by means of a bolt 15 and said end of the extension bar is received in a bifurcation 14 of the longer arm of the lever 11. The extension bar 13 is provided near the end of the lever 11, with a plurality of apertures 17 and a bolt is inserted through any one of said apertures whereby to adjustably connect the forward ends of the link 16 to said extension bar. By this means the levers 11 and 12 are connected together in a pivotal manner. The outer extremity of the extension bar 13 is formed with a plurality of apertures 19 in any one of which a bolt 29 secures a pair of links 32 which extend forwardly.

So far the above description sets forth the construction and arrangements of the parts in the prior patent to R. C. Harris, above referred to, a double tree (not shown in this application), being directly secured to the front ends of the links 32 and carrying a pair of swingle trees at its ends. In the present invention, however, the front ends of the links 32 embrace an equalizing lever 35 and are pivotally connected to said lever between the ends of the latter by means of a bolt 31. The lever 35 is provided at its inner end with a plurality of apertures 34 in any one of which a clevis is secured, said clevis carrying a swingle tree as shown. Intermediate of the ends of the links 32 a bolt 30 passes through said links and also through a transversely extending lever 38 so as to pivotally connect the lever to the links 32, and said lever 38 is provided at its inner end with a plurality of apertures 37 while the lever 35 is also provided with corresponding apertures, and a pair of links pivotally connects the inner end of the lever 38 with the lever 35 at about the middle of the latter, as illustrated. The outer end of the lever 38 is formed with several apertures 39 and an extension bar for the lever 35 is provided with corresponding apertures 43, the extension bar and the lever 38 being connected together in pivotal manner by means of links as shown, bolted in any of the apertures 39 and 43. The inner end of the extension bar 42 is pivotally secured within the bifurcation 40 at the outer end of the lever 35, and the outer end of the extension bar 42 carries a double tree 44 having swingle trees at its ends, and pivotally mounted on the end of the extension bar 43 by being inserted through a loop 45 and connected thereto by a bolt 46.

From the foregoing description in connection with the accompanying drawings, it is believed the operation of the improved four horse evener is obvious, the three horses at the one side of the tongue 10 equaling in draft the single horse at the swingle tree on the opposite side of the tongue.

It is not intended to claim in this application the arrangement of parts before described up to the links 32, as the same forms the basis for the patent above referred to, but

What is claimed and desired to be secured by Letters Patent of the United States, is:

The combination with the front and rear equalizing levers 11 and 12 pivotally connected together, with the swingle tree connected to the short arm of the lever 11 and the extension bar 13 pivotally connected to the long arm of the lever 11 and also connected to the rear lever 12, of a pair of links 32 extending forwardly from the outer end of said extension bar 13 and pivotally connected to the same, an equalizing lever 35 carrying a swingle tree at its inner end and provided with a pivoted extension bar 42 at its opposite end, said lever 35 being pivotally connected to the forward ends of the links 32, another equalizing lever 38 pivotally connected intermediate of its ends to the links 32 in the rear of the lever 35, links pivotally connecting the inner ends of the lever 38 to the lever 35, links pivotally connecting the outer ends of the lever 38 to the said extension bar 42, and a double tree pivotally connected intermediate of its ends to the outer end of the extension bar 42 and carrying swingle trees all as hereinbefore set forth.

In testimony whereof we affix our signatures in presence of two witnesses.

HUGH B. McCOY,
*Administrator de bonis non of Robert C. Harris, deceased.*
HERMAN R. HARRIS.

Witnesses:
LENA L. ROWE,
JOHN F. LACEY.